US008885670B2

(12) United States Patent
Niddam et al.

(10) Patent No.: US 8,885,670 B2
(45) Date of Patent: Nov. 11, 2014

(54) COMPRESSION DEVICE WHEREIN COMPRESSION IS ADAPTED AS A FUNCTION OF THE TRANSPORT MEDIUM, AND ASSOCIATED DECOMPRESSION DEVICE, FOR COMMUNICATION EQUIPMENTS

(75) Inventors: David Niddam, Tournefeuille (FR); Luc Delamotte, Toulouse (FR); Pascal Wuilque, Toulouse (FR)

(73) Assignee: Alcatel Lucent, Boulogne-Billancourt (FR)

( * ) Notice: Subject to any disclaimer, the term of this patent is extended or adjusted under 35 U.S.C. 154(b) by 372 days.

(21) Appl. No.: 11/876,955

(22) Filed: Oct. 23, 2007

(65) Prior Publication Data

US 2008/0098129 A1 Apr. 24, 2008

(30) Foreign Application Priority Data

Oct. 24, 2006 (FR) ...................................... 06 54472

(51) Int. Cl.
*H04J 3/18* (2006.01)
*H04L 29/06* (2006.01)
*H04W 28/06* (2009.01)

(52) U.S. Cl.
CPC .............. *H04L 69/04* (2013.01); *H04W 28/06* (2013.01); *H04L 69/16* (2013.01); *H04L 69/22* (2013.01); *H04L 69/161* (2013.01)
USPC ............ 370/477; 370/389; 370/474; 709/247

(58) Field of Classification Search
USPC ................................................ 709/230–237
See application file for complete search history.

(56) References Cited

U.S. PATENT DOCUMENTS

| 6,967,964 | B1* | 11/2005 | Svanbro et al. | 370/437 |
| 2003/0174897 | A1* | 9/2003 | Le Leannec et al. | 382/240 |
| 2006/0104266 | A1* | 5/2006 | Pelletier et al. | 370/389 |

FOREIGN PATENT DOCUMENTS

WO  WO 02/30043 A2  4/2002

OTHER PUBLICATIONS

Degermark M, et al.: "Low-Loss TCP/IP Header Compression for Wireless Networks" Wireless Networks, ACM, New York, NY, US, vol. 3, No. 5, Oct. 1997, pp. 375-387, XP000728935.
Casner S, et al.: "Compressing IP/UDP/RTP Headers for Low-Speed Serial Links" Internet Citation, Feb. 1999, XP002121319.

* cited by examiner

*Primary Examiner* — Jackie Zuniga Abad
(74) *Attorney, Agent, or Firm* — Fay Sharpe LLP

(57) ABSTRACT

A device (D1) for compression of streams of packets of data, for a communication equipment (E1) constituting a transmission end point in an Internet Protocol communication network (R), the packets of a stream each comprising, in particular, an IP header including a destination end point (E2) identifier, a session identifier and stream attributes, and said packets being intended to be transmitted after decomposition into cells. This compression device (D1) comprises processing means (MT1) responsible, if they receive a packet of a stream, for determining if the IP header of the packet can be compressed as a function of at least one chosen criterion, and for determining if the compression can lead to a reduction in the number of cells having to result from the decomposition of that packet.

19 Claims, 4 Drawing Sheets

COMPRESSION DEVICE WHEREIN COMPRESSION IS ADAPTED AS A FUNCTION OF THE TRANSPORT MEDIUM, AND ASSOCIATED DECOMPRESSION DEVICE, FOR COMMUNICATION EQUIPMENTS

BACKGROUND OF THE INVENTION

The invention concerns Internet Protocol (IP) communication networks, and more precisely the compression and/or decompression of data of IP packets of streams that communication equipments exchange within such networks.

Here "IP communication network (or IP network)" means any type of network having an access network (where applicable a radio access network) capable of transmitting data in the form of cells, for example of ATM (Asynchronous Transfer Mode) type, on a transport medium, for example of the TCP/IP or UDP/IP type. ATM cells are the result of decomposition (or segmentation) of packets of data, for example of IP type, and those packets (here IP packets) comprise an IP header, a header specific to the transport medium (for example UDP or TCP) and payload data. The IP network can in particular be a satellite network, for example a DVB-RCS (Digital Video Broadcasting-Return Channel System) network, providing Internet access via satellite, or an SDMB (Satellite Digital Multimedia Broadcast) network, or a terrestrial network, for example a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting—Handhelds)), or a hybrid (satellite and terrestrial) network.

Generally speaking, the invention applies to any unit (or terminal) that has to send cells (where applicable of ATM type) on the AAL5 layer and in time slots allocated by another remote allocation control unit (for example a gateway or a hub). In fact it is a question here of reducing the number of cells to be sent, which number depends on the size of the data and the headers of protocol(s) utilizing the UDP/IP and TCP/IP layers.

Moreover, here "communication equipment" means any fixed or mobile (or portable or cellular) communication equipment capable of exchanging data by cable or by waves with another equipment, via an access network (where applicable a radio access network). Consequently, it can be, for example, a question of a fixed or mobile (or cellular) telephone, a fixed or portable computer, or a satellite gateway.

As the person skilled in the art knows, to transmit payload data in IP networks the data is integrated into IP packets comprising at least two headers (one of IP type (generally containing 20 bytes), the other of UDP or TCP type (generally containing 20 bytes), or IGMP, ICMP, DNS or SNMP type, for example). In some cases, for example in the presence of satellite transmission on a TCP medium (known as "T/TCP") necessitating an option field (typically of at least 8 bytes), it is also necessary to add thereto a third header known as the "AAL5 trailer" (containing 8 bytes) in order to terminate the AAL5 layer of fragmentation into cells (for example of ATM type).

For a standard TCP acknowledgement without options, 40 bytes (20 bytes for IP and 20 bytes for the TCP acknowledgement) are necessary to fit exactly into the portion reserved for the payload data of a fixed and delimited ATM cell of 48 bytes under AAL5 including the AAL5 trailer of a byte (40+8=48).

For transmission via satellite, it is further necessary to add a T/TCP "option" field of at least 1 byte (and more typically 8 bytes), which totals 56 bytes (20+20+8+8=56), which cannot fit into one ATM cell and therefore necessitates two ATM cells (one containing 48 bytes (20 (IP)+20 (TCP)+8 (options)) and the other containing 8 bytes to describe the trailer of the AAL5 PDU (Packet Data Unit).

For networks in which the assignment of sending locations of cells to be sent (where applicable ATM cells) is a rare and costly resource, it is clear that two cells are then necessary rather than one (a factor of 2 applies to the usable bandwidth because of the "option" field). Generally speaking, if N is the number of initial cells and N−1 the number of final cells after compression, the compression gain is given by the ratio N−1/N, which is highly significant in the case of small packets.

Thus when IP packets are segmented into cells, each cell must comprise the headers of the IP packet from which it comes, the consequence of which is to reduce very significantly the ratio between the payload data transported and the associated header data, and therefore to monopolize a large quantity of resources. This is a particularly severe penalty if the IP network uses an access network the resources whereof are rare and generally costly, for example in the case of a satellite network. Unless otherwise indicated, the expression "header of an IP packet" when used hereinafter means both the IP header and the header of the transport protocol (for example UDP or TCP).

In order to reduce the amount of data to be transmitted, compression techniques can be used at the same time. Thus the ZIP technique can be used, for example. To compress the headers, techniques such as the Van Jacobson, IPHC (RFC 2508) or ROHC (RFC 2509) techniques can be used, for example. However, these techniques are very complex to implement because of their highly generic character and lead to compression of the TCP/IP headers and its T/TCP satellite option. In fact, these techniques are primarily concerned with reducing the size of the TCP/RTP/UDP/IP headers to be sent on a channel but without considering whether this size of headers and the size of the payload data will together occupy N or N−1 containers (here N or N−1 cells).

Moreover, the encoding of the fields to be compressed being based primarily on the difference of the headers to be sent, it is then necessary to use delicate restart mechanisms for TCP the performance whereof in degraded mode (loss of message) is considerably reduced via a satellite access network (major impact on the round trip time).

Moreover, known header compression techniques are applied regardless of the type of header, and thus regardless of the lifetime of the stream to which the header belongs, which can consume computation (CPU) resources unnecessarily.

Finally, the known header compression techniques generally take no account of the availability of computation (CPU) resources and/or local and remote memory resources, which is a problem for low-cost communication equipments (such as mobile or portable terminals, where applicable with satellite access).

No known solution proving entirely satisfactory, an object of the invention is therefore to improve upon this situation.

SUMMARY OF THE INVENTION

To this end it proposes a device dedicated to compression of streams of packets of data, for a communication equipment constituting a transmission end point in an Internet Protocol (IP) communication network, the packets of a stream each (initially) comprising, in particular, an IP header including a destination end point identifier, a session identifier and stream attributes, and a transport protocol header, each packet being intended to be transmitted after decomposition into cells (where applicable of ATM type).

This compression device is characterized in that it comprises processing means responsible, if they receive a packet of a stream to be transmitted:

for determining if the IP header of that packet can be compressed as a function of at least one chosen criterion, then if so, for determining if the compression can lead to a reduction in the number of cells having to result from the decomposition of the received packet, and if so, for replacing in the received packet at least its IP header by a compressed header comprising at least the session identifier and a compression identifier, after having transmitted beforehand (at least once) to the communication equipment constituting the destination end point of the received stream, in a partially compressed form, at least the IP header that has to be replaced.

The compression device according to the invention can have other features, and in particular, separately or in combination:

its processing means can be responsible, in the presence of a TCP type transport protocol, for replacing the IP header of the received packet by a compressed header of two bytes comprising at least the session identifier, a compression identifier and a transport protocol type identifier;

its processing means can be responsible, in the presence of a UDP type transport protocol, for replacing the IP header and the UDP header of the received packet by a compressed header of two bytes comprising at least the session identifier, a compression identifier and a transport protocol type identifier;

its processing means can be responsible for determining if the header of the received packet can be compressed as a function of at least one criterion chosen from the fragmentation of the packet, the transport protocol type, a transport protocol subtype, a compression authorization received from the destination end point, and a local compression authorization;

its processing means can be responsible for determining first and second numbers of cells that would result from the decomposition of the packet of the stream respectively in the absence and in the presence of compression of their header, and for proceeding to the replacement of at least the IP header of the last packet received by an at least partially compressed header if the first number is strictly greater than the second number;

its processing means can be responsible, if they receive a packet of a stream and have decided to compress at least its IP header, i) for assigning to the stream a hashing key as a function of chosen fields of the IP header of its received packet, then ii) for determining in storage means if that hashing key is stored there, and iii) if not, for considering the stream as a new stream and then for storing the hashing key in the storage means if the session identifier that is associated with the flux is available at least from the expiry of a first time-delay, and for proceeding to the replacement of the IP header of the received packet by a partially compressed header, or if so for resetting to zero the first time-delay associated with the session identifier of the stream and for proceeding to the replacement of at least the IP header of the received packet by a compressed header;

its processing means can be responsible either for triggering a second time-delay associated with the stream just before proceeding to the replacement of the IP header of the received packet by a partially compressed header or, after having reset to zero the first time-delay associated with the session identifier of the stream, for determining if the second time-delay associated with this stream has expired in order either to proceed to the replacement of at least the IP header of the received packet by a compressed header if the second time-delay has not expired or to trigger a second time-delay associated with the stream just before proceeding to the replacement of the IP header of the received packet by a partially compressed header;

its processing means can be responsible, after having reset to zero the first time-delay associated with the session identifier of the stream and in the case of non-expiry of the second time-delay associated with that stream, for comparing to a chosen threshold the number of packets of the stream that have been successively transmitted in the form of cells with a compressed header in order either to proceed to the replacement of at least the IP header of the last packet received by the compressed header if the second time-delay has not expired or to trigger the second time-delay associated with the stream just before proceeding to the replacement of the IP header of the received packet by a partially compressed header if the number of packets is greater than or equal to the threshold;

its processing means can be responsible, in case of replacement of at least the IP header of a received packet by an at least partially compressed header, for determining if the payload data associated with the at least partially compressed header can be compressed as a function of at least one chosen criterion, and if so for integrating into that compressed header an identifier signaling the data compression;

its processing means can be responsible for determining if the payload data associated with the at least partially compressed header can be compressed as a function of at least one criterion chosen from the availability of local resources, the availability of decompression resources in the communication equipment constituting the destination end point and the size of the received packet;

its processing means can be responsible, in case of determination of a possibility of compression of the payload data of the packet comprising the compressed header, for determining if the data compression can lead to a reduction in the number of cells that have to result from the decompression of the packet, then, if so, for integrating into the compressed header an identifier signaling the compression of the payload data, and if not, for integrating into the compressed header an identifier signaling the prohibition on compression of the payload data.

The invention also proposes a device dedicated to decompression of cells (where applicable ATM cells) of a stream that has been the subject of compression by means of a compression device of the type described above, for a communication equipment constituting a transmission end point in an IP communication network.

This decompression device is characterized in that it comprises processing means responsible, if they receive cells of a packet of a stream:

for determining if those cells comprise an (the same) at least partially compressed header including in particular a compression identifier and a session identifier, then if so, for determining in storage means if that session identifier is already stored therein and therefore corresponds to a known stream, then if so, either for storing in the storage means the information relating to the stream if the compression identifier signals a partially compressed header, and then for reconstructing the original IP header from the partially compressed header, or, if the compression identifier signals a compressed header, for reconstructing the original header from corresponding information stored in the storage means and designated by the session identifier contained in the received compressed header.

The decompression device according to the invention can have other features, and in particular, separately or in combination:

its processing means can be responsible, if they receive cells of a packet of a stream, for beginning by determining if they concern an IP packet to be decompressed, and if so for determining if those cells comprise an at least partially compressed header only on condition that they concern chosen versions of the Internet Protocol (for example IPv4 or IPv6);

its processing means can be responsible, if the compression identifier signals a partially compressed header, for accessing the storage means to determine if the session identifier contained in that header is stored therein, and if not for storing the session identifier in the storage means, and then for storing in the storage means the information relating to the stream in corresponding relationship to the session identifier;

its processing means can be responsible, if said compression identifier signals a compressed header, for accessing the storage means to determine if the session identifier contained in that compressed header is stored therein, and if not for dropping the packet to which the received cells belong;

its processing means can be responsible, if the compression identifier signals a partially compressed header, for storing in the storage means the information relating to the stream of that header, then for triggering a first time-delay relating to that stream before reconstructing the original IP header from the partially compressed header;

its processing means can be responsible, if the compression identifier signals a compressed header, for resetting to zero (reactivating) the first time-delay associated with the stream of that header, before reconstructing the original header from the corresponding information stored in the storage means and designated by the session identifier contained in the received compressed header;

it can comprise decompression means responsible, in case of reconstruction of the original header of cells of a packet of a stream, for determining if that header comprises a data compression identifier signaling that the cells have been the subject of payload data compression, and if so, either for proceeding to decompress said payload data if there exist locally resources that enable it, or for sending the communication equipment constituting the source of the cells a message signaling saturation of the receive resources and then for dropping the packet to which the received cells belong.

The invention also proposes a communication equipment intended to constitute a transmission end point in an IP network and provided with a compression device and/or a decompression device of the types described hereinabove. Such equipment can, for example, take the form of a satellite terminal or a satellite gateway. It will be noted that the invention applies equally to so-called "star" communication between a terminal and a gateway and so-called "meshed" communication between terminals that do not pass through a gateway.

BRIEF DESCRIPTION OF THE DRAWINGS

Other features and advantages of the invention will become apparent on reading the following detailed description and examining the appended drawings, in which.

DETAILED DESCRIPTION OF THE INVENTION

The appended drawings can constitute part of the description of the invention as well as contributing to the definition of the invention, if necessary.

An object of the invention is to adapt compression as a function of the transport medium, and if possible taking account of the lifetime of the streams and the availability of the computation (CPU) resources and/or local memory resources necessary for compression and/or the computation resources and/or remote memory resources necessary for decompression.

Figure 1:
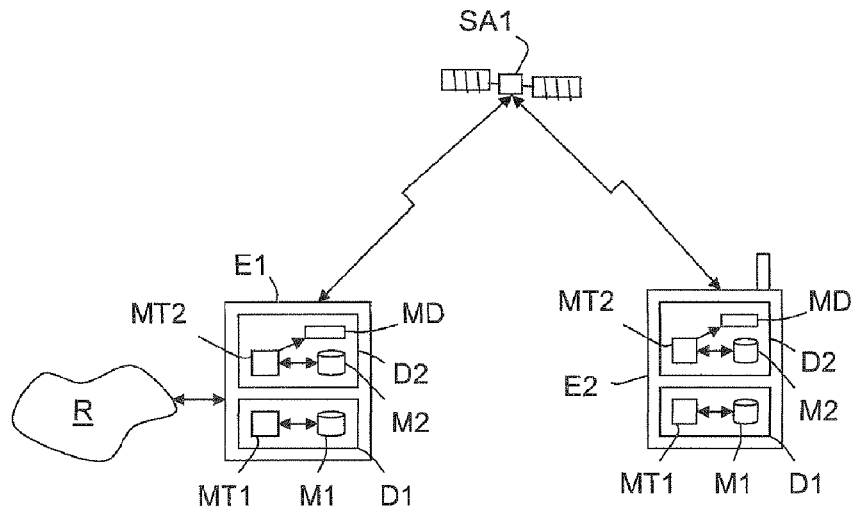
FIG. 1 illustrates in a highly schematic and functional way a satellite network comprising a satellite gateway and a satellite mobile terminal each equipped with one embodiment of a compression device according to the invention and one embodiment of a decompression device according to the invention.

Use of the invention between two communication equipments E1 and E2, constituting communication end points in an Internet Protocol (IP) communication network R is described first with reference to FIG. 1.

It is considered hereinafter by way of nonlimiting example that the IP network is a satellite network, for example of DVB-RCS (Digital Video Broadcasting-Return Channel System) type. However, the invention is not limited to that type of IP network. In fact it concerns any type of IP network having an access network (where applicable a radio access network) capable of transmitting data in the form of cells on a transport medium, for example of TCP/IP or UDP/IP type. The IP network can therefore be a satellite network, for example of SDMB (Satellite Digital Multimedia Broadcast) type, or a terrestrial network, for example of cable (xDSL) type or of mobile or cellular (GPRS/EDGE, or UMTS (where applicable of MBMS (Multimedia Broadcast/Multicast Services) type, or the evolution of the UMTS called LTE (Long Term Evolution), or DVB-H (Digital Video Broadcasting-Handhelds—mobile television)), or a hybrid (satellite and terrestrial) network.

Moreover, it is considered hereinafter, by way of nonlimiting example, that the communication equipments E1 and E2 are respectively a satellite gateway (E1) and a satellite mobile (or cellular) telephone (E2). However, the invention is not limited to these types of communication equipment. In fact it concerns any type of fixed or mobile (or portable or cellular) communication equipment capable of exchanging data by cable or by waves with another equipment, via an access network (where applicable a radio access network). Consequently, it can, for example, be a question of a fixed or mobile telephone, a fixed or portable computer, or even radio equipment for receiving television programs, for example a personal stereo or a fixed or portable television, or radio or cable equipment for receiving video or music programs, or radio equipment on board a vehicle (car, truck, bus, train and the like).

Moreover, it is considered hereinafter, by way of nonlimiting example, and unless explicitly indicated otherwise, that the cells are of ATM (Asynchronous Transfer Mode) type. In fact, sending from a gateway E1 to a terminal E2 (or E2') may not be in ATM mode only (it is conventionally in MPE/MPEG or even ULE/MPEG mode). Sending from a terminal E2 (or E2') to a gateway E1 is on the other hand of ATM type (conventionally AAL5/ATM type).

The invention proposes a compression device D1 and a decompression device D2 intended to be installed in communication equipments connected to the IP network R, or forming part of the latter (in particular of its access network). In the nonlimiting example illustrated in FIG. 1, the satellite gateway E1 and the mobile telephone E2 are each equipped with a compression device D1 and a decompression device D2. This is not obligatory, however. The satellite gateway E1 being equipped only with a compression device D1 and the mobile telephone E2 being equipped only with a decompression device D2 can in fact be envisaged. Generally speaking, all combinations can be envisaged provided that a first communication equipment, constituting a communication end point acting as sender, comprises at least one compression device D1, and that at least one second communication equipment, constituting a communication end point acting as receiver, comprise at least one decompression device D2.

As illustrated schematically and functionally in FIG. 1, a compression device D1 according to the invention comprises at least one processing module MT1 and preferably storage means M1, for example a memory arranged in the form of a table of correspondence, or a tree, or of CAM type.

The processing module MT1 is responsible for compressing at least a portion of the headers of the stream data packets, before the latter are decomposed or segmented into cells (here ATM cells) in order to be transmitted to a communication end point (receiver). A packet of a stream (involved in a session) includes in particular an IP header including a destination end point (receiver) identifier, a session identifier (session_id), and stream attributes, for example the IP version used (IP_version, for example IPv4 or IPv6), IHL, TOS, TTL, the source IP address, the destination IP address, the source port, the destination port, the transport protocol type (for example UDP or TCP), an option field (reserved for future use), a field indicating readiness for compression or decompression (Rx_ready), a reservation field ("reserved", for example for padding and in particular for evolution of the standards).

This processing module MT1 is operative each time that an IP packet of a stream must be transmitted. The operations effected by the processing module MT1 are described hereinafter with reference to the algorithm shown by way of example in FIG. 5.

On reception of an IP packet (step 10), the processing module MT1 begins by determining if the header of that IP packet can be the subject of compression as a function of at least one chosen criterion (step 20). Here "header of an IP packet" means both its IP header and its transport protocol (UDP or TCP) header, where applicable with option header.

Among the criteria that can be used, there may be cited in particular the fragmentation of the packet ("has the packet been fragmented?"), the presence of an option ("does the packet comprise an option?"), the type of transport protocol used (for example UDP or TCP), the subtype of the transport protocol, if any (for example DNS or SNMP or ICMP or T/TCP), the compression authorization received from said destination end point ("has the receiver of the steam authorized compression, because it has sufficient computation (CPU) and/or memory resources to proceed to decompression?"), and local compression authorization ("has the sender of the stream authorized compression, because it has sufficient computation (CPU) resources to proceed to compression and/or it has not yet used all its session identifiers (session_id), of which there are generally 254)").

It is important to note that these criteria can be used separately or in combination (including all of them at once).

Applying a criterion or criteria means that the headers of IP packets belonging to a stream whose service life is reduced or sporadic need not be compressed. This is the case in particular of DNS, SNMP or ICMP streams. It also avoids using local (sender E1) resources to compress IP packets when the resources of the sender E1 dedicated to this function are saturated and/or the resources of the receiver E2 dedicated to decompression are saturated.

If the result of the test effected in the step 20 is negative, then the processing module MT1 transmits the IP packet to a compression module of its equipment E1 (or E2), for example, or of its compression device D1, responsible for compressing the payload data, for example by means of a ZIP type technique.

If the result of the test effected in the step 20 is positive, then the processing module MT1 determines in a step 30 if header compression can reduce the number of ATM cells that will result from the decomposition of the received IP packet.

To do this, the processing module MT1 can, for example, calculate the first number N1 and the second number N2 of ATM cells that would result from the decomposition of the received IP packet respectively in the absence and in the presence of compression of at least its IP header. To this end it effects a simulation. It then authorizes the replacement of at least the IP header of the received IP packet by an at least partially compressed header if the first number N1 is strictly greater than the second number N2 (N1>N2), for example. It could instead calculate the difference between N1 and N2 and authorize header compression if that difference is above a chosen threshold.

In the case of compression preceding sending from a gateway E1 to a terminal E2, the compression gain can be calculated from the ratio in bytes of the sizes in bytes before compression and after compression, and then by comparing that gain to a chosen threshold percentage (for example equal to 10%).

If the result of the test effected in the step 30 is negative, then the processing module MT1 transmits the IP packet to a compression module of its equipment E1 (or E2), for example, or of its compression device D1, responsible for compressing the payload data, for example by means of a ZIP type technique.

If the result of the test effected in the step 30 is positive, then the processing module MT1 replaces in the received IP packet (step 120) at least its IP header by a compressed header (C) that comprises at least the session identifier (session_id) and a compression identifier (for example a specific value of the (ip_version) field dedicated to the version of the IP used).

More precisely, for the processing module MT1 to be able to replace in the received IP packet at least its IP header by a compressed header (C), it must beforehand have transmitted to the receiver (for example E2) that is the destination of the stream the header of that IP packet in a partially compressed (PC) form, in order for it to be in a position to reconstruct the original (complete) header from a compressed header (C). In other words, when an IP packet is received belonging to a (new) unknown stream, the processing module MT1 must first, in a step 110, replace its IP header by a partially compressed IP header (PC). The IP packet, which then comprises a partially compressed IP header (PC) and the original UDP or TCP header, can then be transmitted to the receiver E2, in the form of ATM cells, in order for it to store in storage means M2 (for example a memory, where applicable arranged in the form of a table of correspondence) the information that is contained at least in their compressed IP header PC (as well as their UDP header, only if the transport protocol is UDP). The processing module MT1 can then, in a step 120, replace at least the IP header of the subsequent IP packets of the same stream by a compressed IP header C. Thus when the receiver E2 receives the ATM cells including the compressed header C it can reconstruct the original (complete) header from the compressed header C and information that corresponds to it stored beforehand in the memory M2.

In order to be able to distinguish an IP packet of a known stream from an IP packet of an unknown stream, the processing module MT1 can proceed as follows, for example.

First of all, it can calculate in a step 40 a hashing key associated with the stream to which the received IP packet belongs. In order to be specific to a stream the hashing key can, for example, be calculated from values of at least some of the fields of the IP header of the received IP packet. For example, there may be used for this purpose the identifier of the (destination) receiver, the source IP address, the destination IP address, the source port, the destination port, and the transport protocol type.

Then, in a step 50 the processing module MT1 determines in the memory M1 if the hashing key that it has just calculated is already stored there. If the key is not found to be stored there, it considers the stream as a new stream.

The processing module MT1 preferably then determines, in a step 60, if a session identifier (session_id) is still available for the stream concerned. If not, then the processing module MT1 transmits the IP packet to a compression module of its equipment E1 (or E2), for example, or its compression device D1, responsible for compressing the payload data, for example by means of a ZIP type technique. On the other hand, if a session identifier is available after the expiry of a first time-delay T1, the processing module MT1 stores the new hashing key in the memory M1 (step 70). A first time-delay T1 of chosen duration (typically one minute, for example) is preferably associated with each stream that has just finished in order to be able to re-use it on the expiry of that first time-delay T1 whilst leaving the receiver E2 sufficient time to decompress the last IP packet of that stream.

The processing module MT1 preferably then associates a second time-delay T2 of chosen duration (for example equal to one second (1 s)), to the session of the new stream, and then activates (sets to zero) this second time-delay T2 in a step 80, and proceeds in the step 110 to the replacement of at least the IP header of the received IP packet by a partially compressed header PC. This time-delay then periodically synchronizes the receiver with non-compressed headers to alleviate the degraded modes.

The second time-delay T2 is used to refresh periodically the information that is stored in the memory M2 of the receiver E2 and that defines the original IP header of the IP packets together with the data of the UDP or IP headers of a stream being transmitted.

Figure 2:
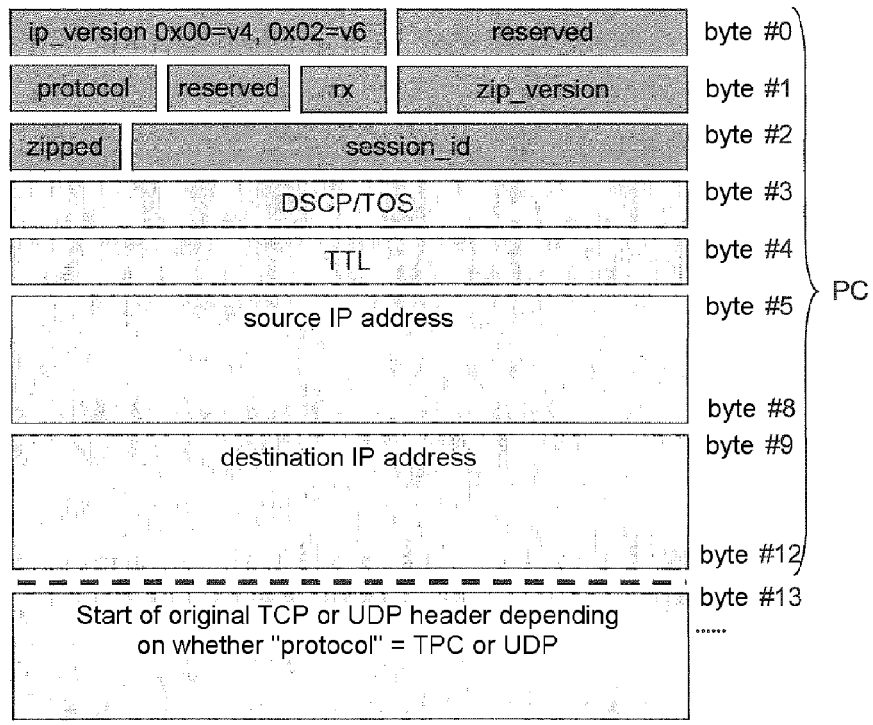
FIG. 2 illustrates in a highly schematic way the principal fields of an IP header partially compressed in accordance with the invention, followed by a UDP or TCP header.

There is represented schematically in FIG. 2 an example of a partially compressed IP header PC, followed by a header dedicated to the transport protocol (for example UDP or TCP).

In this example, the partially compressed IP header PC comprises 13 bytes (instead of the 20 bytes of a standard IP header):

a field (IP_version) designating at the same time the IP version used and the fact that the IP header is partially compressed, for example value 0x00 for IPv4 and value 0x02 for IPv6, on 4 bits, a reservation field ("reserved", for example for padding), on 4 bits, the transport protocol type, on 2 bits, for example the value 00 for UDP and the value 01 for TCP, an option field ("reserved"), for future use, on 1 bit, a field indicating readiness for compression or decompression (Rx_ready), on 1 bit, a payload data compression version field (zip_version), on 4 bits, that identifies the algorithm selected by the sender for compressing the payload data, in order for the receiver to be able to reconstitute the data correctly if it is compressed; some of these algorithms are supplied by free software well known to the person skilled in the art, a field ("zipped"), on 1 bit, signaling if the payload data has been compressed or not, so that the receiver applies decompression of the original data, or not, a session identifier (session_id), on 7 bits, a field "DSCP/TOS", on 1 byte, a field "TTL", on 1 byte, the source IP address, on 4 bytes, and the destination IP address, on 4 bytes.

The assignment and the number of bits of the fields described hereinabove are given by way of illustrative example. They can therefore form the subject of numerous variations.

If the processing module MT1 determines in the step 50 that the hashing key that it has just calculated is stored in the memory M1, that signifies that the stream is known and that its IP packets are being transmitted. Then, in a step 90, it re-activates (resets to zero) the first time-delay T1 associated with the stream of which the received IP packet is part. Then, in a step 100, it effects a test in order to determine if the second time-delay T2 associated with the session identifier of the stream has expired.

If this is the case, then it effects the step 80 (re-activation (resetting to zero) of the second time-delay T2 associated with the session identifier), then the step 110 (replacement of the IP header of the received IP packet by the partially compressed header PC in order to refresh the information on the stream stored in the memory M2 of the receiver E2).

If the result of the test of the step 100 is negative (second time-delay T2 not yet expired), the processing module MT1 proceeds to the replacement of at least the IP header of the received IP packet by a compressed header C.

Figure 3:
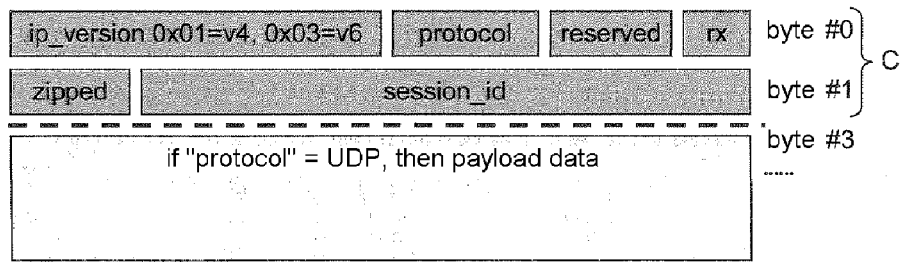
FIG. 3 illustrates in a highly schematic way the fields of a UDP/IP header compressed in accordance with the invention, followed by payload data.

There is schematically represented in FIG. 3 an example of a compressed header C, in the case of a UDP/IP transport medium. In this case, the original IP header and the original UDP header are replaced by a compressed header C of two bytes, followed by payload data.

In the example illustrated, the compressed header C comprises:

the field (IP_version) designating at the same time the IP version used and the fact that the IP and UDP headers are compressed, for example value 0x01 for IPv4 and value 0x03 for IPv6, on 4 bits, the transport protocol type on 2 bits, for example (value 00 for UDP), the option field ("reserved", for future use), on 1 bit, the field indicating readiness for compression or decompression ("Rx_ready"), on 1 bit, the field ("zipped") signaling if the payload data has been compressed or not, on 1 bit, and the session identifier (session_id), on 7 bits.

The assignment and the number of bits of the fields described hereinabove are given by way of illustrative example. They are given here to obtain a header of two bytes, in particular in the presence of a field session_id including seven bits. They can therefore be the subject of numerous variations.

Figure 4:
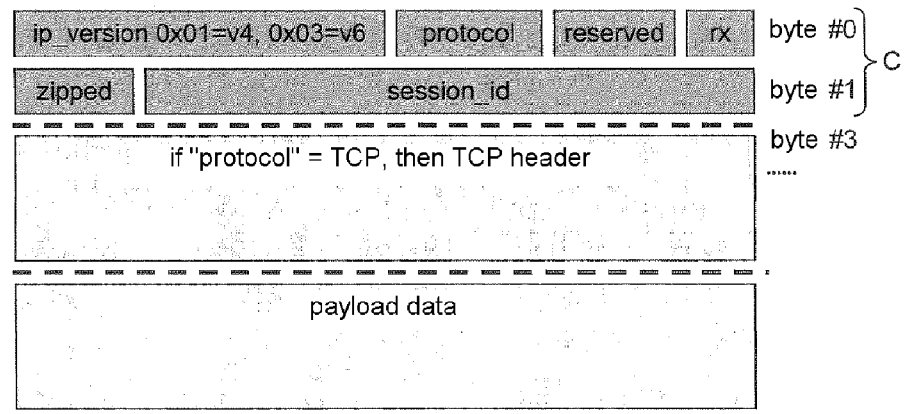
FIG. 4 illustrates in a highly schematic way the fields of an IP header compressed in accordance with the invention, followed by an uncompressed TCP header.

There is also represented schematically in FIG. 4 an example of a compressed header C, in the case of a TCP/IP transport medium. In this case, only the original IP header is replaced by a compressed header PC of two bytes, followed by the TCP header, then payload data (not represented). In the example illustrated, the compressed header C is identical to that described hereinabove with reference to FIG. 3 (only the value of the transport protocol type is different because the transport protocol is now TCP (for example the value 01 is used for TCP)).

It will be noted that in the step 100, after having reset to zero the first time-delay T1 (which is associated with the session identifier of the flux to which the received IP packet belongs) and if the second time-delay T2 associated with that stream has not expired, the processing module MT1 can additionally compare to a chosen threshold the number of packets of the stream that have been transmitted in the form of ATM cells with a compressed header C since the beginning of the last activation of said second time-delay T2. In this case, the processing module MT1 proceeds to the replacement of the IP header (or the IP header and the UDP header) of the last IP packet received with the compressed header C only on the condition that the corresponding second time-delay T2 has not expired and the aforementioned number of packets is below the chosen threshold. In other cases, the processing module MT1 effects the step 80 (reactivation (resetting to zero) of the second time-delay T2 associated with the session identifier), then the step 110 (replacement of the IP header of the received IP packet by the partially compressed header PC).

Figure 5:
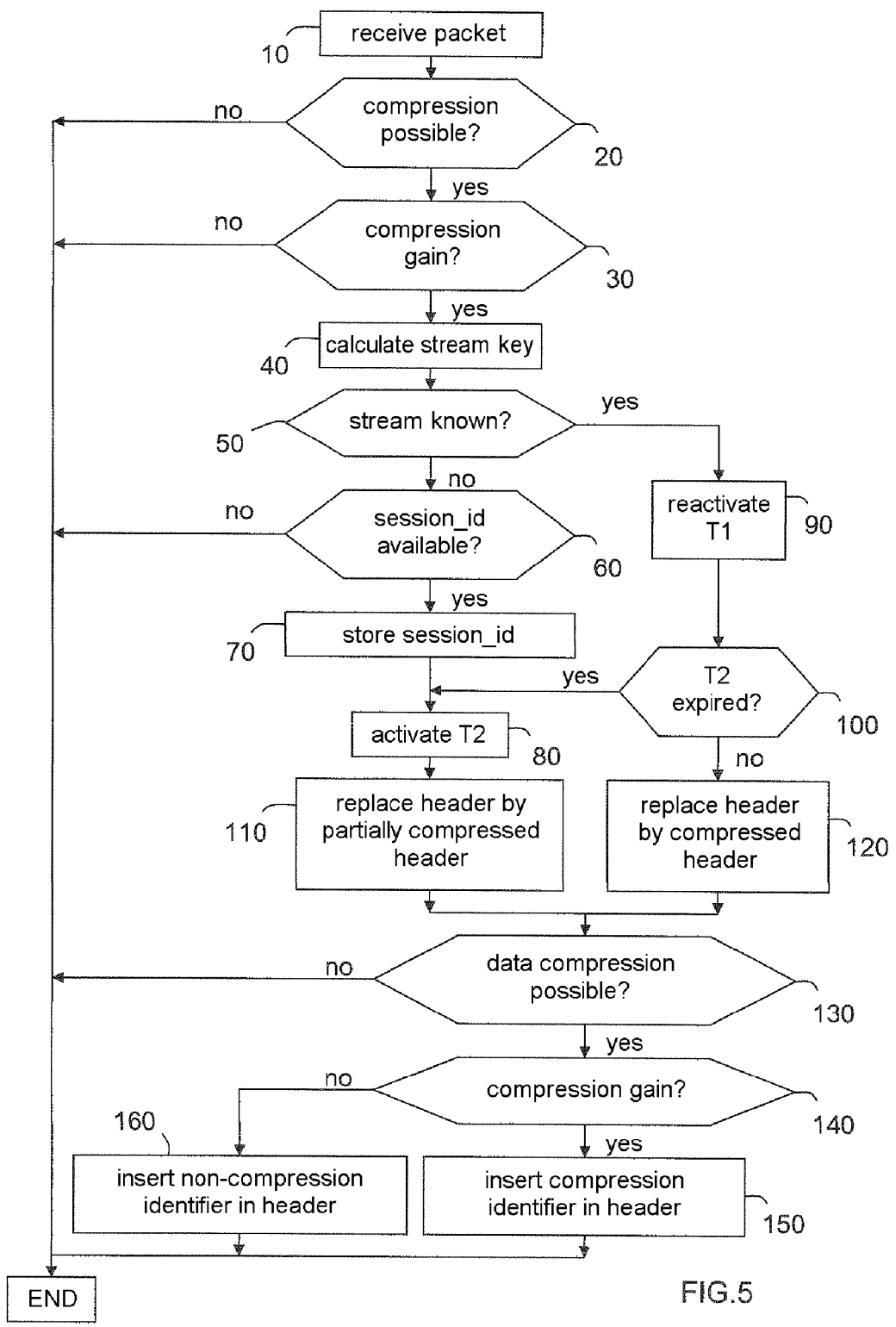
FIG. 5 illustrates schematically one example of a compression algorithm that can be used by a compression device according to the invention.

As shown in FIG. 5, the processing module MT1 of the compression device D1 can also be responsible for determining if it is useful to proceed to compression of the payload data of the received IP packet.

To do this, the processing module MT1 can, for example, start by determining in a step 130 if the payload data associated with the at least partially compressed header (C or PC) can be compressed as a function of at least one chosen criterion.

Among the criteria that can be used, there may in particular be cited the compression authorization received from the destination end point E2 ("has the receiver of the stream authorized compression, because it has sufficient computation (CPU) and/or memory resources to proceed to the decompression?"), the local compression authorization ("has the sender of the stream authorized compression, because it has sufficient computation (CPU) resources to proceed to the compression and/or because it has not yet used all its session identifiers (session_id)?"), and the size of the received packet ("does the packet comprise a number of bytes above a chosen threshold (for example typically equal to 80)").

It is important to note that these criteria can be used separately or in combination (including all at once).

If the IP packet with at least partially compressed header (C or PC) does not satisfy at least one of the criteria applied, then the compression device D1 stops its processing. The IP packet is then segmented (or decomposed) into ATM cells by the sender E1, after which the ATM cells are transmitted to the receiver E2.

If the IP packet with at least partially compressed header (C or PC) satisfies each criterion applied, then the processing module MT1 can, for example, determine in a step 140 if compression of the payload data can in fact lead to a reduction in the number of ATM cells that should result from the decomposition (or segmentation) of the IP packet with at least partially compressed header (C or PC).

To do this, the processing module MT1 can, for example, calculate the first number N1' and the second number N2' of ATM cells that would result from the decomposition of the IP packet with compressed header respectively in the absence and in the presence of compression of its payload data. To do this it effects a simulation. It then authorizes compression of the payload data if the first number N1' is strictly greater than the second number N2' (N1'>N2'), for example. It could instead calculate the difference between N1' and N2' and authorize compression of the payload data if that difference is above a chosen threshold.

Authorization of compression of the payload data is signaled by the processing module MT1 placing in the at least partially compressed header (C or PC) (in a step 150) a chosen first value of the compression identifier ("zipped"). In the presence of a compression authorization the processing module MT1 transmits the IP packet with compressed header (C or PC) to a payload data compression module of its equipment E1 (or E2), or of its compression device D1, responsible for compressing the payload data, for example by means of a ZIP type technique. The IP packet is then segmented (or decomposed) into ATM cells by the sender E1, and the ATM cells are sent to the receiver E2.

The prohibition of compression of the payload data is signaled by the processing module MT1 placing in the at least partially compressed header (C or PC) (in a step 160) a chosen second value of the compression identifier ("zipped"). In the presence of a compression prohibition the compression device D1 stops its processing. It transmits the IP packet with compressed header (C or PC) to its equipment E1 (or E2), for example, in order for it to segment (or decompose) it into ATM cells, and then transmits the ATM cells to the receiver E2.

One embodiment of a decompression device D2 according to the invention is described next with reference to FIGS. 1 and 6.

As schematically and functionally shown in FIG. 1, a decompression device D2 according to the invention comprises at least one processing module MT2 and preferably one payload data decompression module MD and storage means M2, for example a memory taking the form of a table of correspondence, or a tree, or of CAM type.

The processing module MT2 is responsible for decompressing, at a communication end point acting as receiver E2 (or E1), cells (where applicable ATM cells) of an IP packet of a stream that was the subject of compression by means of a compression device D1.

This processing module MT2 is therefore operative each time that a receiver E2 (or E1) has reconstituted a packet of a stream from received (ATM) cells and resulting from its segmentation. The operations effected by the processing module MT2 are described hereinafter with reference to the example of an algorithm shown in FIG. 6.

On reception of a packet (step 200), the processing module MT2 determines in a step 230 if its header is at least partially compressed (C or PC).

As shown, before effecting this step 230, the processing module MT2 preferably begins by determining in a step 210 if the received packet is of IP type. To do this, it analyzes the value of the IP version identifier (IP_version) of its header, for example.

If the packet is not an IP packet, the decompression device D2 stops processing and communicates the packet to its equipment E2 (or E1).

On the other hand, if it is an IP packet, the processing module MT2 preferably determines in a step 220 the IP version used (for example IPv4 or IPv6). That type is defined by the value of the IP version identifier (IP_version) of the header of the received ATM cell. For example, the values 0x00, 0x02 and 0x04 designate IPv4, while the values 0x01, 0x03 and 0x06 designate IPv6.

If the value of the identifier of the IP version is equal to 0x04 or 0x06 (and therefore does not correspond to an IP subjected to compression in accordance with the invention), the decompression device D2 stops its processing and communicates the IP packet to its equipment E2 (or E1).

On the other hand, if the value of the IP version identifier corresponds to an IP subjected to compression in accordance with the invention, the decompression device D2 determines in the step 230 if the header of the received IP packet is at least partially compressed (C or PC).

Two situations can arise here. If the value of the IP version identifier corresponds to complete header compression (C—for example value 0x01 or 0x03), then the processing module MT2 proceeds to a step 280 described later. If the value of the IP version identifier corresponds to partial header compression (PC—for example value 0x00 or 0x02), then the processing module MT2 proceeds to a step 240.

In the step 240, the processing module MT2 determines in the memory M2 of its decompression device D2 if the session identifier (contained in the partially compressed header PC of the IP packet) is already stored therein and thus corresponds to a known stream.

If the session identifier is not stored in the memory M2, that indicates that the received IP packet belongs to a new stream. The processing module MT2 then stores the new session identifier in the memory M2, in a step 250.

It then proceeds to a step 260 in which it stores (again in the memory M2) the information relating to the new stream (i.e. the information contained in the IP header and where applicable in the UDP header) in corresponding relationship to the session identifier previously stored (in the step 250). It is this stored information (relating at least to the IP header) that will subsequently enable the processing module MT2 to reconstruct complete entities from compressed headers C.

Before beginning each step 260, the processing module MT2 preferably verifies if its (receiver) equipment E2 (or E1) has computation (CPU) resources available for reconstructing the IP header (or the IP header and the UDP header) properly.

If so, it proceeds to the step 260 described later.

On the other hand, if the (receiver) equipment E2 (or E1) does not have sufficient computation and/or memory resources, the decompression device D2 requests its receiver equipment E2 (or E1) to inform the sender equipment E1 (or E2) of this.

This can be done by using a particular value of the "Rx_ready" field of the IP header, for example. On reception of such information, the compression device D1 of the sender equipment E1 (or E2) momentarily ceases to authorize local compression of headers and associated payload data. Compression can resume subsequently as soon as the (receiver) equipment E2 (or E1) has informed the sender equipment E1 (or E2) of the end of saturation of its computation and/or memory resources dedicated to decompression.

This terminates the processing effected on the IP packet by the decompression device D2.

If the session identifier is stored in the memory M2, that indicates that the received IP packet belongs to a known stream. The processing module MT2 is then responsible for refreshing in the memory M2, in the step 260 (preferably after verifying the local availability of calculation and/or memory resources), the information relating to the known stream (i.e. the information contained in the IP header and in the UDP header, if any, and that is to be stored in corresponding relationship to the session identifier of the stream).

In the same step 260 the processing module MT2 preferably associates a first time-delay T1' with the session identifier of the stream, and then activates it (sets it to zero). This first time-delay T1' represents a duration that is preferably slightly shorter than that of the first time-delay T1 of the compression device D1. This first time-delay T1' is used to monitor a stream with the aim of releasing the context that has been allocated to the current session if it is not used during a time period greater than or equal to T1'. As a general rule, T1'=T1−10 sec (T1 being typically of the order of one minute).

Then, in a step 270 the processing module MT2 reconstructs the original IP header of the ATM cells of the received IP packet from their partially compressed header PC, and in those ATM cells replaces the partially compressed header PC by the reconstructed IP header.

If the processing module MT2 becomes aware during the test of the step 230 that the value of the IP version identifier does not correspond to partial header compression (PC), it then proceeds to the step 280. In the latter step, the processing module MT2 determines if the header of the received IP packet corresponds to header compression C.

If the value of the IP version identifier does not correspond to complete header compression of type C, then the processing module MT2, in a step 290, drops the received IP packet, as there is an inconsistency.

On the other hand, if the value of the IP version identifier does indeed correspond to complete header compression (C—for example value 0x01 or 0x03), then the processing module MT2 proceeds to a step 300.

In the step 300, the processing module MT2 determines in the memory M2 of its decompression device D2 if the session identifier (contained in the compressed header C of the IP packet) is already stored therein and therefore corresponds to a known stream.

If the session identifier is not stored in the memory M2, then the processing module MT2, in the step 290, drops the received packet, because there is some inconsistency.

On the other hand, if in the step 300 the processing module MT2 becomes aware that the session identifier is stored in the memory M2, and therefore does indeed correspond to a known stream, it proceeds to a step 310 in which it reactivates (resets to zero) the first time-delay T1' that is associated with the session identifier of the stream. This reactivation of the first time-delay T1' serves to reactivate the stream (in order to release the associated context in the case of inactivity).

Then, in a step 320 the processing module MT2 reconstructs only the original IP header (in the case of a TCP transport protocol) and the original IP header as well as the original UDP header (in the case of a UDP transport protocol) from the compressed header C contained in the (ATM) cells of the received IP packet and corresponding information stored in the memory M2 during a previous step 260. It then replaces in each ATM cell of the received IP packet the compressed header C by the reconstructed header.

Figure 6:
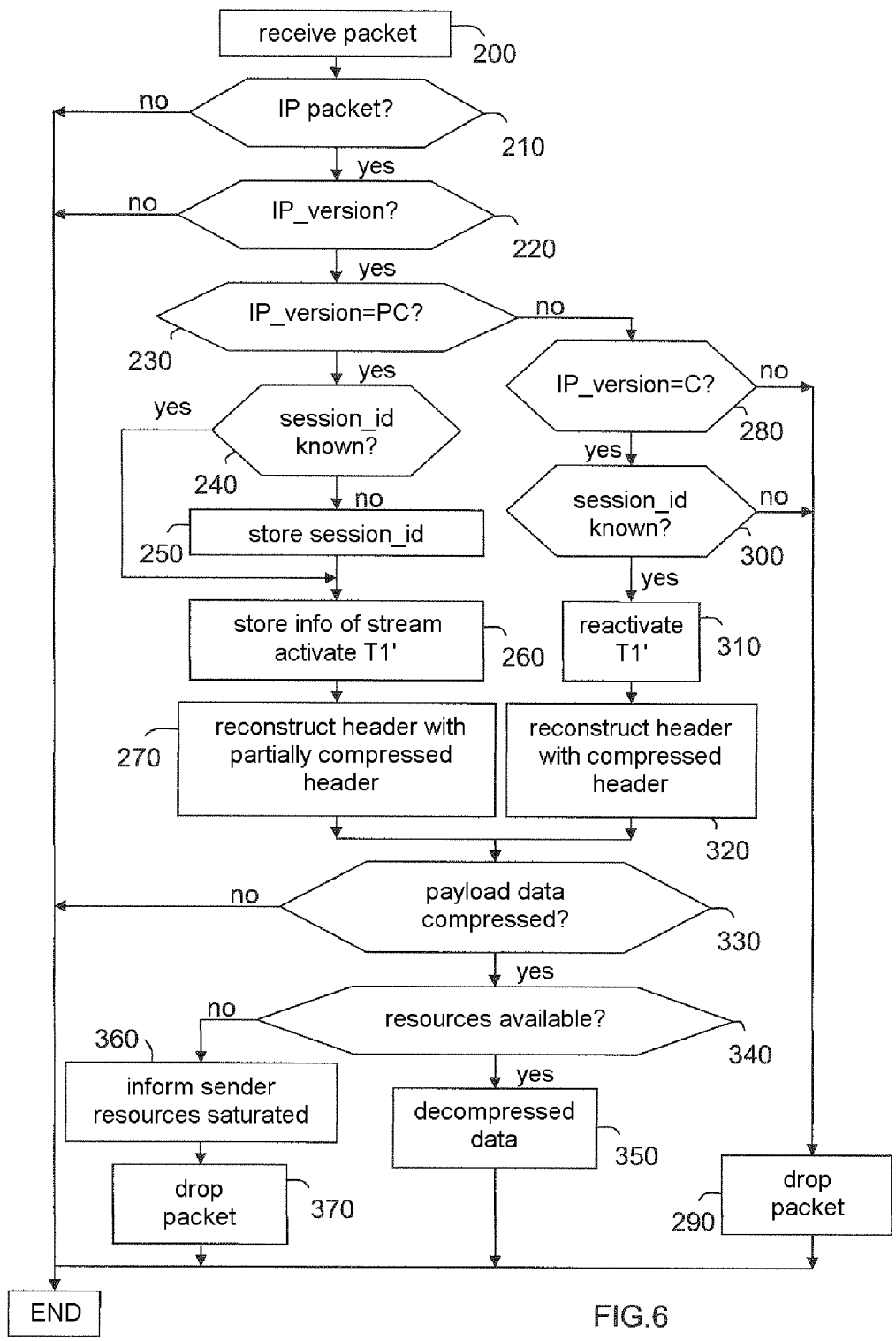
FIG. 6 illustrates schematically one example of a decompression algorithm that can be used by a decompression device according to the invention.

As shown in FIG. 6, the decompression device D2 can also be responsible for decompressing the payload data of the received ATM cells, once their original header has been reconstructed.

To do this, it can for example comprise a payload data decompression module MD responsible firstly for determining in a step 330 if the received packet contains compressed payload data. To this end it can analyze the value of the "zipped" field.

If the payload data has not been compressed, the decompression device D2 stops its processing of the IP packet.

On the other hand, if the payload data has been compressed, the decompression module MD determines in a step 340 if its (receiver) equipment E2 (or E1) has computation (CPU) resources available for decompressing the payload data properly.

If this is the case, the decompression module MD decompresses the payload data of the received IP packet using the technique that is the inverse of that used by the compression module of the sender equipment E1 (or E2), for example "UNZIP" (or any other decompression technique). The IP packet is then entirely decompressed, which terminates the processing effected on the IP packet by the decompression device D2.

On the other hand, if the (receiver) equipment E2 (or E1) does not have sufficient computation resources, the decompression device D2 requests its receiver equipment E2 (or E1), in a step 360, to inform the sender equipment E1 (or E2) of this.

This can be done for example by using a particular value of the "Rx_ready" field of the compressed header. On receipt of such information, the compression device D1 of the sender equipment E1 (or E2) temporarily ceases to authorize local compression of the payload data (and the associated headers, if any). Compression can resume subsequently as soon as the (receiver) equipment E2 (or E1) has informed the sender equipment E1 (or E2) of the end of saturation of its computation resources dedicated to decompression or on the expiry of a third time-delay T3 at the sender end, typically with a value of the order of one second (sender configuration parameter).

Then, in a step 370 the decompression device D2 drops the IP packet (received in segmented form) given that it is not in a position to decompress its payload data. This then terminates the processing effected on the IP packet (received in segmented form) by the decompression device D2.

The compression device D1 according to the invention, and in particular its processing module MT1 and memory M1, if any, and the compression device D1 according to the invention, and in particular its processing module MT2 and its decompression module MD and memory M2, if any, can be produced in the form of electronic circuits, software (or electronic data processing) modules, or a combination of circuits and software.

Figure 7:
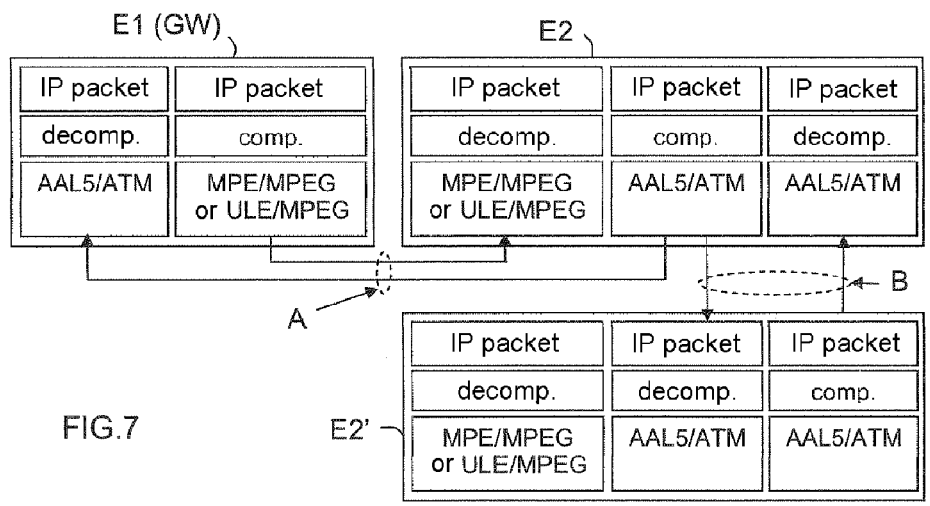
FIG. 7 illustrates schematically and functionally the "locations" at which the compression and decompression operations are effected in the case of communication between a gateway and a terminal (A) and between two terminals (B), respectively.

The "locations" at which the operations of compression (D1) and decompression (D2) are effected in the case of communication between a gateway E1 and a terminal E2 (A) and between two terminals E2 and E2' (B), respectively, are shown schematically and functionally in FIG. 7.

More precisely, the case A corresponds to star communication between a gateway E1 and a terminal E2 while case B corresponds to meshed communication between two terminals E2.

At a terminal E2 (or E2') compression (D1) is effected on sending just before IP over AAL5/ATM encapsulation, while decompression (D2) is effected on reception either just after reassembly of MPE/MPEG or ULE/MPEG type (compression by a gateway E1 to the DVB-S or DVB-S2 standard) intended to reconstitute the IP packets, in case A (star), or just after reassembly of AAL5/ATM type intended to reconstitute the IP packets, in case B (meshed).

At a gateway E1 compression (D1) is effected on sending just before IP over MPE/MPEG or IP over ULE/MPEG encapsulation (compression by a gateway E1 to the DVB-S or DVB-S2 standard), while decompression (D2) is effected on reception just after reassembly of AAL5/ATM type intended to reconstitute the IP packets.

The invention offers a certain number of advantages, including:

estimation of the compression gain before compression is effected and only if compression is possible, simple and robust header compression, especially in the case of the adaptation layer known as "AAL5", compression/decompression can be effected dynamically as a function of the calculation resources available locally, the available memory size, and the number of sessions already open in parallel, an implementation of significantly reduced complexity compared to those imposed by RFCs, reduced computation and memory powers, transmission of compressed headers of 2 bytes (instead of 40) in the case of a UDP/IP type transport protocol, of 22 bytes (instead of 40) in the case of a TCP/IP type transport protocol without options, and of 30 bytes (instead of 56) in the case of a TCP type transport protocol with satellite option (T/TCP), all these headers therefore occupying only one ATM cell (of 48 bytes maximum including the AAL5 trailer of 8 bytes), a "UDP checksum" field that does not need to be recomputed (because it is set to zero and a CRC32 is used in the low-level protocol layers (MPE, AAL5)), so saving on computation resources at the time of decompression, if the compression header is present (identified by the IP_version field), then it is possible to compress the application data according to the local/remote resources and above all if a data compression gain is in fact obtained for a given stream (there is no benefit in continuing to attempt to compress the data if the size after compression is greater than or equal to the original size because an additional header (overhead) is added and the entropy is at a maximum, i.e. in the absence of redundant information that can benefit from a compression gain), the degraded TCP (with option) mode can continue to be used without disruption caused by the fact that the TCP header has not been compressed.

The invention is not limited to the compression device, decompression device and communication equipment embodiments described hereinabove by way of example only, but encompasses all variants that the person skilled in the art might envisage within the scope of the following claims.

Thus there have been described hereinabove examples of communication equipment comprising both a compression device according to the invention and a decompression device according to the invention. However, a communication equipment according to the invention may include only a compression device according to the invention or only a decompression device according to the invention.

Moreover, there has been described hereinabove a situation in which a sender (provided with a compression device) transmits compressed streams to a single receiver (provided with a decompression device). However, the compression device of a sender can process in parallel a plurality of streams intended for a plurality of receivers (each provided with a decompression device).

The invention claimed is:

1. A device for compression of streams of packets of data, for a communication equipment comprising a transmission end point in an Internet Protocol (IP) communication network, said packets of a stream each comprising an IP header including a destination end point identifier, a session identifier and stream attributes, and a transport protocol header, and said packets to be transmitted after decomposition into cells, the device comprising:

a processing module configured, in case of reception of a packet of a stream, to:

determine if the IP header of said packet can be compressed as a function of at least one chosen criterion, then if so, to determine if said compression can lead to a reduction in the number of cells having to result from the decomposition of said packet, and if so, to replace in said packet at least said IP header by a compressed header comprising at least the session identifier and a compression identifier, after having transmitted beforehand to said destination end point of the received stream, in a partially compressed form, at least the IP header that has to be replaced; and in case of replacement of at least the IP header of a received packet by an at least partially compressed header, determine if the payload data associated with the at least partially compressed header can be compressed as a function of at least one chosen criterion, and if so, to integrate into the at least partially compressed header an identifier signaling the data compression.

2. The device according to claim 1, wherein said processing module is adapted configured, in the presence of a Transmission Control Protocol (TCP) type transport protocol, to replace the IP header of the received packet by a compressed header of two bytes comprising at least the session identifier, a compression identifier and a transport protocol type identifier.

3. The device according to claim 1, wherein said processing module is adapted configured, in the presence of a User Datagram Protocol (UDP) type transport protocol, to replace the IP header and the UDP header of the received packet by a compressed header of two bytes comprising at least the session identifier, a compression identifier and a transport protocol type identifier.

4. The device according to claim 1, wherein said processing module is configured to determine if the header of the received packet can be compressed as a function of at least one criterion chosen in a group comprising at least the fragmentation of the packet, the transport protocol type, a transport protocol subtype, a compression authorization received from said destination end point, and a local compression authorization.

5. The device according to claim 1, wherein said processing module is configured to determine first and second numbers of cells that would result from the decomposition of the packet of the stream respectively in the absence and in the presence of compression of their header, and to proceed to the replacement of at least the IP header of the last packet received by an at least partially compressed header if said first number is strictly greater than said second number.

6. The device according to claim 1, wherein said processing module is configured, in case of reception of a packet of a stream and the taking of a decision to compress at least its IP header, assign a hashing key to said stream as a function of chosen fields of the IP header of its received packet, to determine in a storage module if that hashing key is stored therein, and if not, to consider said stream as a new stream, and then to store said hashing key in said storage module if the session identifier associated with said stream is available at least from the expiry of a first time-delay, and to proceed to the replacement of the IP header of said received packet by a partially compressed header, or if so to reset to zero said first time-delay associated with the session identifier of said stream and to proceed to said replacement of at least the IP header of said received packet by a compressed header.

7. The device according to claim 6, wherein said processing module is configured either to trigger a second time-delay associated with said stream just before proceeding to the replacement of the IP header of the received packet by a partially compressed header or, after having reset to zero said first time-delay associated with the session identifier of said stream, to determine if said second time-delay associated with said stream has expired in order either to proceed to said replacement of at least the IP header of the received packet by a compressed header if said second time-delay has not expired or to trigger a second time-delay associated with said stream just before proceeding to the replacement of the IP header of the received packet by a partially compressed header.

8. The device according to claim 7, wherein said processing module is configured, after having reset to zero said first time-delay associated with the session identifier of said stream and in the case of non-expiry of said second time-delay associated with said stream, to compare to a chosen threshold the number of packets of said stream that have been transmitted in the form of cells with a compressed header in order either to proceed to said replacement of at least the IP header of the last packet received by said compressed header if said second time-delay has not expired or to trigger said second time-delay associated with said stream just before proceeding to the replacement of the IP header of the received packet by a partially compressed header if said number of packets is greater than or equal to said threshold.

9. The device according to claim 1, wherein said processing module is configured to determine if the payload data associated with said at least partially compressed header can be compressed as a function of at least one criterion chosen in a group comprising at least the availability of local resources, the availability of decompression resources in said destination end point and the size of the received packet.

10. The device according to claim 1, wherein said processing module is configured, in case of determination of a possibility of compression of the payload data of the packet comprising the compressed header, to determine if said data compression can lead to a reduction in the number of cells that has to result from the decomposition of said packet, then, if so, to integrate into said compressed header an identifier signaling said compression of the payload data, and if not, to integrate into said compressed header an identifier signaling the prohibition on compression of the payload data.

11. A device for decompression of cells of a stream that have been the subject of compression by a compression device for a communication equipment constituting a transmission end point in an Internet Protocol (IP) communication network, the device comprising:

a processing module configured, in case of reception of cells of a packet of a stream, determine if they comprise an at least partially compressed header including in particular a compression identifier and a session identifier, then if so to determine in a storage module if said session identifier is already stored therein and therefore corresponds to a known stream, then if so, either to store the information relating to said stream in said storage module if said compression identifier signals a partially compressed header, and then to reconstruct the original IP header from said partially compressed header, or, if said compression identifier signals a compressed header, to reconstruct the original header from corresponding information stored in said storage module and designated by the session identifier contained in the received compressed header; and a decompression module configured, in case of reconstruction of the original header of cells of a packet of a stream, to determine if said header comprises a data compression identifier signaling that the cells have been the subject of payload data compression, and if so, either to proceed to the decompression of said payload data if there exist locally resources that enable it, or to send the communication equipment constituting the source of said cells a message signaling saturation of the receive resources and then drop said received packet.

12. The device according to claim 11, wherein said processing module is configured, in case of reception of cells of a packet of a stream, to begin by determining if they concern an IP packet to be decompressed, and if so to determine if said cells comprise an at least partially compressed header only on condition that they concern chosen versions of the Internet Protocol (IP).

13. The device according to claim 11, wherein said processing module is configured, if said compression identifier signals a partially compressed header, to access said storage module to determine if the session identifier contained in that header is stored therein, and if not to store said session identifier in said storage module, and then to store the information relating to said stream in said storage module in corresponding relationship to said session identifier.

14. The device according to claim 11, wherein said processing module is configured, if said compression identifier signals a compressed header, to access a storage module to determine if the session identifier contained in that compressed header is stored therein, and if not to drop said received packet.

15. The device according to claim 11, wherein the processing module is configured, if the compression identifier signals a partially compressed header, to store in said storage module the information relating to the stream of that header, then to trigger a first time-delay relating to that stream before reconstructing the original IP header from the partially compressed header.

16. The device according to claim 11, wherein said processing module is configured, if the compression identifier signals a compressed header, to reset to zero (reactivate) the first time-delay associated with the stream of that header, before reconstructing the original header from corresponding information stored in said storage module and designated by the session identifier contained in the received compressed header.

17. A communication equipment comprising a transmission end point in an Internet Protocol communication network, wherein the communication equipment comprises a compression device and/or a decompression device according to claim 11.

18. The communication equipment according to claim 17, wherein the communication equipment is chosen in a group comprising at least a satellite terminal and a satellite gateway.

19. A device for compression of streams of packets of data, for a communication equipment comprising a transmission end point in an Internet Protocol (IP) communication network, said packets of a stream each comprising an uncompressed IP header including a destination end point identifier, a session identifier and stream attributes, and a transport protocol header, and said packets to be transmitted after segmentation into cells, the device comprising:

a processing module operative, in case of reception of a packet of a stream, to:

determine if the IP header of said packet can be compressed as a function of at least one chosen criterion, then if so, to determine if said compression can lead to a reduction in the number of cells having to result from the decomposition of said packet, and if so, to replace in said packet at least said IP header by a compressed header comprising at least the session identifier and a compression identifier, after having transmitted beforehand to said destination end point of the received stream, in a partially compressed form, at least the IP header that has to be replaced, wherein the compression identifier signals a partially compressed header or a compressed header, wherein a partially compressed header comprises a number of bytes that is less than the number of bytes in a standard header; and in case of replacement of at least the IP header of a received packet by an at least partially compressed header, determine if the payload data associated with the at least partially compressed header can be compressed as a function of at least one chosen criterion, and if so, to integrate into the at least partially compressed header an identifier signaling the data compression.

* * * * *